United States Patent [19]

Suzuki

[11] Patent Number: 4,889,905

[45] Date of Patent: Dec. 26, 1989

[54] CURABLE ORGANOPOLYSILOXANE COMPOSITION

[75] Inventor: Toshio Suzuki, Tokyo, Japan

[73] Assignee: Toray Silicone Company Limited, Tokyo, Japan

[21] Appl. No.: 930,633

[22] Filed: Nov. 14, 1986

[30] Foreign Application Priority Data

Dec. 17, 1985 [JP] Japan .................................. 60-283637

[51] Int. Cl.$^4$ ............................................. C08G 77/22
[52] U.S. Cl. ........................................ 528/30; 528/32; 528/33; 528/34; 522/99
[58] Field of Search ...................... 522/99; 528/30, 32, 528/34, 33

[56] References Cited

U.S. PATENT DOCUMENTS

| | | | |
|---|---|---|---|
| 4,033,924 | 7/1977 | Mine et al. ........................... | 525/477 |
| 4,052,529 | 10/1977 | Bokerman et al. .................... | 528/32 |
| 4,082,635 | 4/1978 | Fritz et al. ............................. | 528/32 |
| 4,087,585 | 5/1978 | Schulz .................................. | 524/862 |
| 4,279,717 | 7/1981 | Eckberg et al. ...................... | 522/99 |
| 4,596,720 | 6/1986 | Keryk et al. .......................... | 528/30 |

*Primary Examiner*—John C. Bleutge
*Assistant Examiner*—Ralph H. Dean, Jr.
*Attorney, Agent, or Firm*—George A. Grindahl

[57] ABSTRACT

Radiation-curable organopolysiloxane compositions containing an alkenyl-substituted organopolysiloxane, a mercaptoalkyl-substituted organopolysiloxane and an aliphatically unsaturated silicon compound bearing at least one silicon-bonded alkoxy or alkoxyalkoxy radical have improved adhesion to a substrate when coated and cured thereon. The compositions can further contain a photosensitizer, a catalyst for the reaction of silicon-bonded alkoxy groups and other components such as fillers, stabilizers, colorants and flame retardants. The compositions are useful as an adhesive or coating for various substrates and in various industries.

4 Claims, No Drawings

CURABLE ORGANOPOLYSILOXANE COMPOSITION

BACKGROUND OF THE INVENTION

The present invention relates to a curable organopolysiloxane composition. More specifically, the present invention relates to an ultraviolet radiation- or electron beam-curable organopolysiloxane composition which bonds well to substrates in contact with it during curing.

With regard to the art of imparting adhesiveness to ultraviolet-curable or electron beam-curable organopolysiloxane compositions which employ the reaction of lower alkenyl groups with mercaptoalkyl groups, an adequately efficient method has not been proposed up to now. Although in general curable organopolysiloxane compositions have good affinity for glass, and so may be satisfactorily adhered to glass, ultraviolet radiation-curable or electron beam-curable organopolysiloxane compositions which employ the reaction of lower alkenyl groups with mercaptoalkyl groups are completely non-adhesive in many cases.

Accordingly, when an ultraviolet radiation- or electron beam-curable organopolysiloxane composition which employs the reaction of lower alkenyl groups with mercaptoalkyl groups is used as a protective coating in electric or electronic applications or as a surface coating for wood or paper, the problem arises that it is easily peeled from the surface of the substrate due to its poor adhesiveness. Thus, the coating function is lost.

BRIEF SUMMARY OF THE INVENTION

The present inventors examined various methods in order to overcome this problem in the prior art, and the present invention was developed as a result. The object of the present invention is to provide an improved ultraviolet radiation- or electron beam-curable organopolysiloxane composition which will adhere to substrates in contact with it during curing.

This object, and others which will become apparent to one of ordinary skill in the organopolysiloxane art, are accomplished, generally speaking, by a curable organopolysiloxane composition comprising (i) an organopolysiloxane component bearing an average of at least 2 lower alkenyl groups in each molecule, (ii) an organopolysiloxane component which contains at least 2 mercaptoalkyl groups in each molecule, and (iii) an organosilicon compound having in each molecule at least 1 aliphatically unsaturated organic group and at least 1 Si-bonded alkoxy or alkoxyalkoxy group.

The quantities of these three components are limited such that the molar ratio of the total quantity of mercaptoalkyl groups to the total quantity of all alkenyl groups in components (i) and (iii) is from 0.3:1 to 5.0:1, and component (iii) does not exceed 1/5, as a weight ratio, of the quantity of component (i).

DETAILED DESCRIPTION OF THE INVENTION

Specifically, the present invention relates to a curable organopolysiloxane composition comprising (i) an organopolysiloxane component having the average unit formula $R_aSiO_{(4-a)/2}$ wherein R is a monovalent hydrocarbon group, a has an average value of from 0.8 to 2.2 and which contains at least 2 lower alkenyl groups in each molecule, (ii) an organopolysiloxane component which contains at least 2 mercaptoalkyl groups in each molecule and, optionally, R groups except alkenyl groups, in a quantity such that the molar ratio of the total quantity of mercaptoalkyl groups in this component to the total quantity of all alkenyl groups in components (i) and (iii) is (0.3:1) to (5.0:1), and (iii) an organosilicon compound having in each molecule at least 1 Si-bonded aliphatically unsaturated organic group and at least 1 silicon-bonded group selected from the group consisting of alkoxy and alkoxyalkoxy, in a quantity not exceeding one-fifth, as a weight ratio, of the quantity of component (i).

By way of explanation of the above, component (i) can be any organopolysiloxane having the above-stated formula and is the principal component of the curable organopolysiloxane composition of the invention; it reacts and crosslinks with component (ii) under the action of ultraviolet radiation or an electron beam.

The lower alkenyl groups therein are exemplified by vinyl, allyl and propenyl. While the lower alkenyl groups may be present at any location in the molecule, they preferably appear at least at the molecular terminals. The term "lower" in this instance has the conventional meaning, i.e. from 1 to 6 carbon atoms.

R can be any monovalent hydrocarbon group and is exemplified by alkyl groups such as methyl, ethyl, propyl, butyl, octyl, decyl and octadecyl; aryl groups such as phenyl, tolyl, benzyl and phenylethyl; halogenated alkyl groups such as chloropropyl and trifluoropropyl; and the alkenyl groups mentioned above. In addition to R, some hydroxyl groups may be present in component (i).

To obtain good bonding, preferably at least 50 mol % of R groups is methyl. Although a is to be 0.8 to 2.2 on average, it is preferably 1.95 to 2.05 on average in order to obtain good bonding.

The molecular configuration of this component may be straight chain, branch-containing straight chain, cyclic, network or 3-dimensional, but it is preferably a straight chain which may or may not contain a few branches.

The molecular weight of this component is not specifically restricted and its viscosity may range from a low-viscosity liquid to a very high-viscosity gum. The viscosity is preferably in the range of 50 to 100,000 centipoise (cP) at 25° C. from a consideration of ease of operations in mixing and adhesion.

Component (i) is exemplified by vinylpolysiloxane, vinylsiloxane-co-methylsiloxane copolymer, dimethylvinylsiloxy group-terminated dimethylpolysiloxane, dimethylvinylsiloxy group-terminated dimethylsiloxane-co-methylphenylsiloxane copolymer, dimethylvinylsiloxy group-terminated dimethylsiloxane-co-methylvinylsiloxane copolymer, dimethylvinylsiloxy group-terminated dimethylsiloxane-co-diphenylsiloxane-co-methylvinylsiloxane copolymer, tri-methylsiloxy group-terminated dimethylsiloxane-co-methylvinylsiloxane copolymer, trimethylsiloxy group-terminated dimethylsiloxane-co-methylphenylsiloxane-co-methylvinylsiloxane copolymer, dimethylvinylsiloxy group-terminated methyl(3,3,3-trifluoropropyl)-polysiloxane, dimethylvinylsiloxy group-terminated dimethylsiloxane-co-methyl-(3,3,3-trifluoropropyl)-siloxane copolymer, and polysiloxanes composed of $CH_2=CH(CH_3)_2SiO_{\frac{1}{2}}$ units, $(CH_3)_3SiO_{\frac{1}{2}}$ units and $SiO_{4/2}$ units.

The combination of dimethylvinylsiloxy group-terminated diorganopolysiloxane with polysiloxane composed of $CH_2=CH(CH_3)_2SiO_{\frac{1}{2}}$ units, $(CH_3)_3SiO_{\frac{1}{2}}$ units and $SiO_{4/2}$ units may be used as component (i) when a higher strength is sought in the cured product of the organopolysiloxane composition of the invention.

Component (ii) can be any organopolysiloxane having at least two silicon-bonded mercaptoalkyl groups but it has no aliphatically unsaturated groups. Component (ii) is the crosslinker for component (i) and it reacts with the lower alkenyl groups of component (i) under the action of ultraviolet radiation or an electron beam in order to provide curing.

The molecular structure of this component is not specifically restricted, and it may be straight chain, branch-containing straight chain, network or cyclic. The molecular weight of this component is also not specifically restricted, but the viscosity is preferably 1 to 50,000 cP at 25° C. in order to obtain good miscibility with component (i).

The mercaptoalkyl groups are, for example, mercaptomethyl, mercaptoethyl, mercaptopropyl, mercaptoisopropyl, mercaptobutyl, mercaptoisobutyl, mercaptopentyl and mercaptoisopentyl, but mercaptomethyl, mercaptopropyl and mercaptoisobutyl are preferred considering the reactivity with lower alkenyl groups. Other than mercaptoalkyl groups, groups which also may be bonded to silicon encompass monovalent hydrocarbon groups, which are exemplified as for R of component (i), preferably methyl but excluding alkenyl.

Concrete examples of component (ii) are trimethylsiloxy-terminated dimethylsiloxane-co-methylmercaptopropylsiloxane copolymers, trimethylsiloxy-terminated dimethylsiloxane-co-methylmercaptomethylsiloxane copolymers, trimethylsiloxy-terminated dimethylsiloxane-co-methylmercaptoisobutylsiloxane copolymers, trimethylsiloxy-terminated methylmercaptopropylpolysiloxanes, trimethylsiloxy-terminated methylmercaptoisobutylpolysiloxanes, methylmercaptopropyl cyclic polysiloxanes, methylmercaptoisobutyl cyclic polysiloxanes, dimethylsiloxane-methyl-mercaptopropylsiloxane cyclic copolymers, dimethylsiloxanemethylmercaptoisobutyl-siloxane cyclic copolymers, hydroxyl-terminated dimethylsiloxane-co-methylmercaptopropylsiloxane copolymers, hydroxyl-terminated dimethylsiloxane-co-methylmercaptoisobutylsiloxane copolymers, hydroxyl-terminated methylmercaptopropylpolysiloxanes, hydroxyl-terminated methylmercaptoisobutylpolysiloxanes, copolymers composed of $HS(CH_2)_3(CH_3)_2SiO_{1/2}$ units and $SiO_{4/2}$ units, copolymers composed of $(CH_3)_3SiO_{1/2}$ units, $HS(CH_2)_3(CH_3)_2SiO_{1/2}$ units and $SiO_{4/2}$ units, copolymers composed of $HSCH_2(CH_3)_2SiO_{1/2}$ units and $SiO_{4/2}$ units and copolymers composed of $(CH_3)_3SiO_{1/2}$ units, $HSCH_2(CH_3)_2SiO_{1/2}$ units and $SiO_{4/2}$ units Component (ii) is added in a quantity such that the molar ratio of mercaptoalkyl groups in this component to the total quantity of all alkenyl groups in components (i) and (iii) is (0.3:1) to (5.0:1). When this molar ratio is less than 0.3:1 good curability cannot be obtained. A foul odor is readily emitted when this molar ratio exceeds a value of 5.0:1.

Furthermore, when alkenyl group-containing siloxane is added especially for reinforcement or other purposes, this mercaptoalkyl-containing component is to be supplementally added so as to offset these alkenyl groups.

Component (iii) is the component which is characteristic of the organopolysiloxane composition of the invention. It develops an excellent adhesiveness of the composition for substrates in contact with the composition during curing.

This component is an organosilicon compound which contains at least 1 silicon-bonded aliphatically unsaturated group and at least 1 alkoxy or alkoxyalkoxy group in each molecule. Its molecular configuration is not specifically restricted and encompasses various species ranging from a silane with 1 silicon atom to polysiloxanes having, for example, more than 10 silicon atoms.

The aliphatically unsaturated organic group is exemplified by alkenyl groups such as vinyl, allyl and propenyl and acryloyloxy- and methacryloyloxy-substituted hydrocarbon groups.

The alkoxy group is exemplified by methoxy, ethoxy, propoxy, butoxy, isopropenoxy and beta-methoxyethoxy.

Concrete examples of this component are as follows: vinyltrimethoxysilane, vinyltrialkoxysilane, vinyltris(betamethoxyethoxy)silane, allyltrimethoxysilane, allyltriethoxysilane, allyltris(beta-methoxyethoxy)silane, gamma-methacryloyloxypropyltrimethoxysilane, gamma-acryloyloxypropyltrimethoxysilane, gamma-methacryloyloxypropyltriethoxysilane, gamma-acryloyloxypropyltriethoxysilane, trimethoxysiloxy-terminated vinylpolysiloxane, trimethoxysiloxy-terminated vinylsiloxane-dimethylsiloxane copolymer, as well as vinylpolysiloxanes and vinylsiloxane-dimethylsiloxane copolymers, both of which have terminals blocked with groups expressed by $ASi(OCH_3)_2—$ where A is an epoxy group-possessing monovalent organic group.

Polysiloxane with the structure

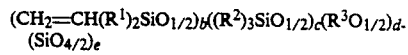

$$(CH_2=CH(R^1)_2SiO_{1/2})_b((R^2)_3SiO_{1/2})_c(R^3O_{1/2})_d(SiO_{4/2})_e$$

is an example of an even more preferred embodiment of component (iii). This type of polysiloxane component will be discussed in detail. It is a three-dimensional polysiloxane in which $SiO_{4/2}$ units form the core and are bonded via their oxygen atoms to dialkylvinyl siloxy units, trialkylsiloxy units and alkoxy units.

This component is to have less than 30 $SiO_{4/2}$ units because the presence of 30 or more $SiO_{4/2}$ units causes the molecular weight to be too high to develop adhesiveness. The number of $SiO_{4/2}$ units is preferably no more than 20 from a consideration of the miscibility of this component with component (i), and is preferably at least 3 in order to avoid volatilization during degassing.

In the structure, b and d both are at least 1 because good adhesiveness cannot be developed at less than 1. The value of c is 0 or more, and the value of (b+c)/d is 0.2 to 2 because good adhesiveness cannot be generated outside these ranges. The value of (b+c+d)/e is to be 0.4 to 4 because good adhesiveness cannot be developed at values less than 0.4 while a material with a value exceeding 4 essentially cannot be produced.

$R^1$, $R^2$ and $R^3$ are all non-alkenyl $C_1$ to $C_3$ monovalent hydrocarbon groups and they are exemplified by methyl, ethyl and propyl. Methyl is preferred for $R^1$ and $R^2$, and methyl and ethyl are preferred for $R^3$.

An even more preferred embodiment is the reaction mixture of this polysiloxane with an epoxy group-containing silane with the formula $ASi(OR^4)_3$. In the formula, the group expressed by A is an epoxy group-containing organic group and this is concretely exemplified by epoxycyclohexylalkyl and glycidoxyalkyl. The monovalent hydrocarbon group $R^4$ is to be a $C_1$ to $C_3$ alkyl group and methyl and ethyl are preferred. Concrete examples of this component are 3-glycidoxypropyltrimethoxysilane, epoxycyclohexylethyltrimethoxysilane, 3-glycidoxypropyltriethoxysilane and epoxycyclohexylethyltriethoxysilane.

The reaction mixture of polysiloxane with epoxy functional silane can be produced by transalkoxylation between the polysiloxane and the epoxy functional silane in the presence of an acid or base catalyst, or by an alcohol-liberating reaction between OH groups, which remain in the polysiloxane in extremely small quantities, with the alkoxy groups.

The polysiloxane:epoxy functional silane mixing ratio in the reaction is to exceed 1:10 because good adhesion cannot be obtained at less than 1:10.

The quantity of addition of component (iii) is not to exceed 1/5 as a weight ratio relative to component (i) because a greater addition adversely affects the original properties of the composition. The optimal quantity of addition which will provide good adhesiveness will vary with the structures of the other components; however, it is generally 1 to 8 weight parts per 100 weight parts component (i).

The curable organopolysiloxane composition of the invention is produced by simply mixing components (i), (ii) and (iii) with each other. Any mixing device appropriate for the agitation of a liquid or gum may be used here, for example, planetary mixers, screw mixers, static mixers and kneader mixers.

It is recommended that a sensitizer be added to the curable organopolysiloxane composition of the invention in order to promote the reaction during ultraviolet irradiation. Sensitizers are exemplified by aromatic ketones and their derivatives such as benzophenone, acetophenone, propiophenone and Michler's ketone, and by peroxides such as benzoyl peroxide, dicumyl peroxide and butyl peroxide. The sensitizer is preferably added at approximately 0.1 to 10% based on the entire composition.

In addition, it is recommended that small quantities or very small quantities of phenols, quinones, amines, acetylene compounds or derivatives thereof be added to the composition of the invention in order to suppress the curing reaction in the dark.

Furthermore, titanium compounds, tin compounds or aluminum compounds may be added as catalysts in order to promote the development of adhesiveness in the composition of the invention. Also, fillers such as very finely particulate silica, heat stabilizers, colorants and flame retardants may be added unless they adversely affect the object of the invention.

While the composition of the invention can be cured with various high-energy radiation, ultraviolet radiation and electron beams are preferred. The ultraviolet source is not specifically restricted as long as it generates radiation at wavelengths of 200 to 400 nm; radiation which cures typical ultraviolet-curable compositions. Preferred examples are high-pressure and low-pressure mercury lamps, xenon lamps and halogen lamps. The appropriate dose of ultraviolet radiation is 0.5 to 100 $mJ/cm^2$.

Either a spot beam type or an electrocurtain type is a suitable electron beam source; a range of 50 to 500 keV is preferred for the acceleration voltage; and the appropriate electron beam dose is 0.1 to 10 Mrad.

The compositions of this invention can be applied to a substrate by any of the well known methods that are used to coat a substrate and in any suitable thickness. By suitable thickness it is meant any thickness that is less than a thickness that prevents the full-depth curing of the composition.

Examples of substrates to which this invention is applicable include, as to material, siliceous materials such as glass and ceramics; metals; resins; cellulosic substrates such as paper and cardboard; and synthetic polymers and, as to form, sheet, fiber and more complex form.

Examples of various industries in which this invention is useful include the electric-electronic industry, measurement instrument industry, auto industry, machine industry, civil engineering and construction industry, container and packaging industry, and medical instrument industry.

The invention will now be further explained by the following examples of execution, not limitation. "Parts" in the examples denote parts by weight and % denotes percent by weight in regard to content and quantity of addition. The viscosity and other properties were measured at 25° C.

EXAMPLE 1

Five organopolysiloxane compositions are prepared and coated on glass plates. These are prepared from dimethylvinylsiloxy-terminated dimethylpolysiloxane with a viscosity of 2,000 centipoise (Polymer A1); trimethylsiloxy-terminated dimethylsiloxane-co-methylmercaptopropylsiloxane (former:latter = 9:1 molar ratio) with a viscosity of 160 centipoise (Polymer X1); polysiloxane with the formula

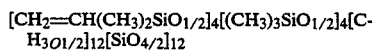

(Polymer M1); 2-hydroxy-2-methylpropiophenone (Sensitizer 1); p-methoxyphenol (Stabilizer 1), vinyltrimethoxysilane (Silane 1); a mixture of Polymer M1 and 3-glycidoxypropyltrimethoxy silane in a 2:1 weight ratio (Mixture 1); and the reaction mixture (Reaction Product 1) obtained by reacting mixture 1 at 100° C. for 1 hour in the presence of 500 ppm KOH as catalyst, followed by neutralization with acetic acid after removal of methanol, heating at reduced pressure to remove low-boiling components, and then purification by filtration. The formulations are detailed in Table 1.

Each composition is coated onto glass and cured by exposure to ultraviolet radiation at 345 nm with a strength of 30 $mJ/cm^2$.

The adhesion of the cured material to the glass is measured 24 hours after curing and the results are reported in Table 1. The values reported for adhesion in Table 1 are the % cohesive rupture, that is, the proportion of the area in which the cured material is so firmly adhered on the glass plate that it cannot be easily peeled.

This example demonstrates the improved adhesiveness to glass of the compositions of this invention compared to a composition which does not contain all of the components of the compositions of this invention.

TABLE 1

| Component | Comparison | Invention | Invention | Invention | Invention |
|---|---|---|---|---|---|
| Polymer A1 | 100 | 100 | 100 | 100 | 100 |
| Polymer X1 | 7.2 | 7.2 | 7.2 | 7.2 | 7.2 |
| Sensitizer 1 | 1.0 | 1.0 | 1.0 | 1.0 | 1.0 |
| Stabilizer 1 | 0.01 | 0.01 | 0.01 | 0.01 | 0.01 |
| Polymer M1 | | 2.0 | | | |
| Silane 1 | | | 2.0 | | |
| Mixture 1 | | | | 2.0 | |
| Reaction product 1 | | | | | 2.0 |
| Adhesiveness (%) | 0 | 50 | 30 | 60 | 80 |

EXAMPLE 2

Experiments were conducted as described in Example 1 using a dimethylvinylsiloxy-terminated dimethylsiloxane-methylphenylsiloxane copolymer (former:latter = 40:60 molar ratio) with a viscosity of 1,500 centipoise (Polymer A2), a methylmercaptopropyl cyclic polysiloxane with an average molecular weight of 610 (Polymer X2), Sensitizer 1, Stabilizer 1, Polymer M1, Mixture 1, Reaction product 1 and gamma-methacryloyloxypropyltrimethoxysilane (Silane 2). However, the ultraviolet dose was 30 mJ/cm$^2$. These formulations and results are reported in Table 2.

TABLE 2

| Component | Comparison | Invention | Invention | Invention | Invention |
|---|---|---|---|---|---|
| Polymer A2 | 100 | 100 | 100 | 100 | 100 |
| Polymer X2 | 3.0 | 3.0 | 3.0 | 3.0 | 3.0 |
| Sensitizer 1 | 1.0 | 1.0 | 1.0 | 1.0 | 1.0 |
| Stabilizer 1 | 0.01 | 0.01 | 0.01 | 0.01 | 0.01 |
| Polymer M1 | | 3.0 | | | |
| Silane 2 | | | 3.0 | | |
| Mixture 1 | | | | 3.0 | |
| Reaction product 1 | | | | | 3.0 |
| Adhesiveness (%) | 0 | 60 | 40 | 80 | 100 |

EXAMPLE 3

A composition is prepared from 100 parts of a polysiloxane with a viscosity of 510 centipoise and composed of trimethylsiloxy units, dimethylvinylsiloxy units, dimethylsiloxy units and methylsiloxy units (2:0.56:3:94.44 molar ratio); 6.5 parts trimethylsiloxy-terminated dimethylsiloxane-co-methylmercaptoisobutylsiloxane copolymer (former:latter = 9.5:1 molar ratio) with a viscosity of 140 centipoise; and 2 parts Polymer M1 as described in Example 1. This composition is coated on a glass plate and cured by irradiation with an electron beam (2.5 Mrad, 165 kV, 2.5 mA). The adhesiveness of the composition to glass is examined 24 hours after curing, and the % cohesive rupture is found to be 65%. In the comparison example, the composition lacking Polymer M1 has a % cohesive rupture of 0%.

EFFECTS OF THE INVENTION

The characteristic of the present invention is that an ultraviolet radiation- or electron beam-curable organopolysiloxane composition has an excellent adhesion to substrate with which it is in contact during curing due to the addition of a prescribed quantity of adhesion promoter in the form of component (iii). Accordingly, the curable organopolysiloxane composition of the invention is appropriate for use as an adhesive or coating for a variety of substrates and in a variety of industries. In particular, because it is cured by the action of ultraviolet radiation or an electron beam, it is extremely useful when rapid curing is required, or when a thermosetting adhesive cannot be used because the substrate has a low heat tolerance.

That which is claimed is:

1. A curable organopolysiloxane composition comprising
   (i) an organopolysiloxane component having the average unit formula $R_aSiO_{(4-a)/2}$ wherein R is a monovalent hydrocarbon group, a has an average value of from 0.8 to 2.2 and which contains at least 2 lower alkenyl groups having 1 to 6 carbon atoms in each molecule,
   (ii) an organopolysiloxane component which contains at least 2 mercaptoalkyl groups in each molecule and, optionally, R groups except alkenyl groups, in a quantity such that the molar ratio of the total quantity of mercaptoalkyl groups in this component to the total quantity of all alkenyl groups in components (i) and (iii) is (0.3:1) to (5.0:1), and
   (iii) an organosilicon compound having in each molecule at least 1 Si-bonded aliphatically unsaturated organic group and at least 1 silicon-bonded group selected from the group consisting of alkoxy and alkoxyalkoxy, in a quantity not exceeding one-fifth, as a weight ratio, of the quantity of component (i).

2. A curable organopolysiloxane composition described in claim 1 wherein component (iii) is an alkenyltrialkoxysilane.

3. A curable organopolysiloxane composition described in claim 1 wherein component (iii) is an organosilicon compound which contains a acryloyloxy or methacryloyloxy group and a silicon-bonded alkoxy group.

4. A curable organopolysiloxane composition described in claim 1 wherein component (iii) is selected from the group consisting of
   (a) a polysiloxane expressed by the formula

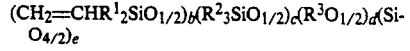
   $(CH_2=CHR^1{}_2SiO_{1/2})_b(R^2{}_3SiO_{1/2})_c(R^3O_{1/2})_d(SiO_{4/2})_e$ in which $SiO_{4/2}$ units are bonded via their oxygen atoms to dialkylvinyl siloxy units, trialkylsiloxy units and alkoxy units wherein $R^1$, $R^2$ and $R^3$ are all $C_1$ to $C_3$ monovalent hydrocarbon groups, excluding alkenyl groups; b and d are at least 1; c is 0 or more; (b+c)/d is 0.2 to 2; (b+c+d)/e is 0.4 to 4 and e is less than 30, and
   (b) the reaction mixture of component (a) with a silane with the formula $ASi(OR^4)_3$ wherein $R^4$ is a $C_1$ to $C_3$ hydrocarbon group and A is an epoxy group-containing monovalent organic group, wherein the component (a):silane weight ratio is equal to or greater than 1:10.

* * * * *